Patented Oct. 18, 1938

2,133,464

UNITED STATES PATENT OFFICE 2,133,464

RESINOUS LIQUID COMPOSITION

Emil E. Novotny, Philadelphia, Pa., assignor, by mesne assignments, to Durite Plastics, Incorporated, Philadelphia, Pa., a corporation of Pennsylvania No Drawing. Application July 14, 1936,
Serial No. 90,489

11 Claims. (Cl. 260—57)

This invention relates to the manufacture of resinous liquid compositions and more particularly to the manufacture of an alkaline synthetic resin liquid for use primarily in the art of cold molding.

In my co-pending application to the "Manufacture of synthetic resin bonded abrasive articles", Serial No. 90,490, filed July 14, 1936, there is set forth the use and advantages of the resinous liquid composition of the present invention when employed as a coating and bond for the abrasive grains and as a bond for an added dry pulverized synthetic resin. When so used, there is produced a wet abrasive mix which is self-converted to a dry granular mix, capable of being cold molded. The resinous liquid compositions when manufactured in accordance with the principles of the present invention possesses such physical and chemical characteristics that it reacts with the added dry resin to produce a wet mix wherein there is no unsuspended or vagrant pulverized resin (the resin being then all coated on the abrasive grains), which wet mix then self-converts or spontaneously changes to a dry granular mix composed of discrete all-resin-coated abrasive particles. This resinous liquid composition is also generally useful in the cold molding art as a coating for various fillers and particularly inorganic fillers.

The resinous liquid composition which functions as a converting liquid in the process (converting the mix from the wet-to-dry state) as well as an intermediate and final bond in the molded product, consists of three or four types of materials which govern the converting action of the composition. These materials will be referred to herein as coherer, incoherer, regulator and solubilizer. In the case of certain water soluble gums or resinous products the solubilizer may be omitted, but in the case of phenol-formaldehyde resins the solubilizer is an essential material.

The term "coherer" is used to designate specifically certain unreacted phenol, phenol alcohols, but preferably certain low resinification reaction products. This product called the coherer should be more or less miscible with the incoherer (e. g. water), yet it must not be a powerful solvent nor must it be capable of dissolving large quantities of the incoherer. This product is provided by carrying the resinification reaction to a definite point beyond the phenol alcohol stage whereby a mixture is obtained comprising a small amount of phenol alcohol and a relatively large amount of lowly reacted resinous products. This product is, as will be seen, a solvent for the regulator (e. g. the more highly reacted products). It is likewise a solvent for any added dry pulverized resin as used in the molding mix, or at least a solvent for a major portion of such pulverized resin. The viscosity of this coherer product should be relatively low, yet preferably over one second and not over five seconds at 25° C. if timed in an R. P. C. (R. P. Cargille) viscosity tube. The product should be substantially non-volatile and more or less neutral; and if this coherer were separated from the rest of the composition and were by itself mixed with the dry pulverized resin in the ratio of say one part or so of the coherer to three parts of the pulverized resin, the mass would flux down to a homogeneous melt and a strong inherent structure would result with the coherer a compatible and homogeneous part of the solidified resin. While the coherer must be a good solvent for the dry resin, yet at the same time the solvent properties must be limited, and this is effected by carrying out the reaction to determined limits.

As a further explanation of the coherer, I might state that in the case of phenol-formaldehyde resins, phenols, cresols, etc. are too powerful as solvents, and that by determining the percentage of such phenol and cresol and regulating the reaction I convert these to substances which are chemically akin thereto, but of greater complexity, that is, higher molecular weight and higher viscosity, such as the simpler condensation polymerization products resulting through the reaction of the phenol and formaldehyde. In general with the reaction between phenol and formaldehyde on substantially an equal molar basis with a sufficient amount of catalyst to provide an energetic reaction I am enabled to provide a resinous reaction product containing a sufficient amount of these low resinification reaction products which act as the coherer. Preferably I use a basic catalyst such as sodium hydroxide.

The term "incoherer" is used to designate a non-resinous liquid body of low viscosity, high surface tension, volatile at room temperature, chemically substantially neutral and of such a nature that the solubilizer (e. g. NaOH) will render this incoherer more or less a solvent for the regulator and the dry or solid pulverized resin. Water is a specific and preferred example of this product where a phenol-aldehyde resin system is used, although other volatile liquids having solvent characteristics adapted to the specific resinous system employed are useful.

The incoherer should be compatible and retained in substantial quantities without separation in combination with the other ingredients. As a specific illustration the presence of water is essential for the attaining of the self-conversion of the "wet to dry" feature in a phenol-aldehyde resin system. The function of the water is at least three-fold. Firstly, it aids in lowering the initial viscosity without increasing the solvent properties for the dry or solid resin, as would be the case if the water were replaced by other thin fluid materials having a greater solvent action such as phenol, phenol alcohol and the lower condensation products; secondly, the water increases the effective surface tension of the film surrounding the coated filler such as the abrasive grains; and, thirdly, it plays an important part in self-converting a wet mix to a dry state.

The term "regulator" is used to designate a material which is chemically akin to both the solid pulverized resin and the coherer, but which in molecular complexity is closer to the solid pulverized resin than the coherer. As in the case of the coherer, the regulator likewise comprises a graded mixture of more highly reacted products and this grading seems to be most desirable. The characteristics of the regulator and coherer with respect to the solid resin require that a chemical compatibility or kinship is desirable and that while the coherer represents lowly reacted products, the regulator represents products of relatively high molecular weight. The solid pulverized resin to be used therewith also comprises products of higher molecular complexity. Between these, however, there is no definite cleavage line and the reaction products overlap.

The term "solubilizer" is used to designate a material which is used only in instances where the best available incoherer (water) is insufficiently compatible with the solutions that result when resin is dissolved by the resinous liquid. This is the case where phenol-formaldehyde resins are used in the making of the resinous liquid. The solubilizer consists of a strongly alkaline body such as sodium hydroxide or its equivalents; and its purpose is to prevent the incoherer from extending an excessive insolubilizing effect upon the coherer. The incoherer including the alkali comprises an aqueous alkaline liquid and converts the resin of the resinous liquid to an aqueous alkaline solution in that it is more or less of a solvent for the regulator and the solid pulverized resin subsequently used. This stabilizer, such as NaOH, is useful for a variety of reasons. Firstly, it aids in regulating the water tolerance and the rate at which water concentrates on the outer surfaces as the abrasive grains become coated with the resinous mixture. The NaOH also aids in controlling the rate of mutual solution and in lowering the surface tension. In a sense the NaOH may be looked upon also as a coupling agent between the water and the non-water portions that result from the solution of the solid resin into the solvent portions of the resinous liquid.

The initial surface tension of the resinous liquid should be sufficiently low so as to permit a ready and complete wetting of the abrasive grains or other filler thereby and by the initial solution products that result when solid resin dissolves into it. The initial viscosity of the resinous liquid should be low enough to permit of a ready flow so that the forces of surface tension can exert their full play and so that all irregularities in the grain or other filler may be filled without air entrapment.

The resinous liquid is possessed of certain definite characteristics which are given generally in the following tabulation, but which are given as average limits in greater detail in the tabulation entitled "Resinous liquid data", comprising various test constants and limits.

1. Viscosity must be kept relatively low.
2. Viscosity must increase rapidly when solid pulverized resin is dissolved therein.
3. Solvent power for the solid pulverized resin, both with respect to the rapidity with which it can dissolve the solid pulverized resin and the quantity thereof before the liquid passes into a phase describable as a soft solid.
4. The final and most important criterion is the ability to yield self-converting wet to dry abrasive mixes within a reasonably short period of time.

Where a phenol-formaldehyde resin is used in preparing the resinous liquid the following "approximate optimum" percentage composition comprises the four divisions of such fluid.

|  | High | Low | Approximate optimum |
|---|---|---|---|
|  | Percent | Percent | Percent |
| 1. Coherer | 70 | 20 | 40 |
| 2. Incoherer | 45 | 15 | 28 |
| 3. Regulator | 40 | 10 | 30 |
| 4. Solubilizer | 10 | 0.50 | 2 |
|  |  |  | 100 |

It will be noted that in this tabulation under "approximate optimum" data, I show the approximate optimum admixtures and it is only this column which therefore totals 100%. The percentages given under high and low should be considered as high and low limits for each one of the four functional products with the understanding that considering each one of these on the basis of high or low limits that adjustments must be made in the others to provide a resinous liquid which produces a composition mix self-converting from the wet to the dry state.

While the resinous liquid data gives average conditions covering the resinous liquid as a total, for simplicity it should be understood that the regulator and the coherer are each possessed of specific physical characteristics and each can be easily differentiated from the other in that the regulator possesses OH groups inactivated in the range of from 30 to 50% and the coherer represents low reaction products whose per cent inactivated phenolic (OH) groups lies approximately in the range of from 5 to 20%. However, in the process of production and because the product is superior, a material is present which lies midway between the regulator and coherer and thus overlaps the characteristics of both, and the phenolic (OH) groups inactivated in this borderline material is approximately within the range of 20 to 30%. In a properly formulated resinous liquid, the regulator and coherer exert a mutual influence upon one another and these materials in general will yield a figure including the borderline material giving certain per cent inactivated phenolic (OH) for the resinous liquid; and it is this figure which is given in the resinous liquid data as an average.

Given a liquid mixture it is possible by various means to determine the relative quantities of regulator and coherer. The regulator represents highly polymerized and condensed material whereas the coherer consists of low resinification reaction products. This permits one to differentiate between these types by determining the water tolerance in methanol of the resinous liquid. The highly polymerized and condensed materials are possessed of a very low water tolerance whereas the lowly resinified materials are possessed of a very high or infinite water tolerance. Very specific information is obtainable if the unit weight of material used in this water solubility test be directly proportional to the gram moles phenolic (OH) groups inactivated as previously determined, for then in each instance we will be subjecting to the test one and the same quantity of gram moles phenolic (OH) groups inactivated, and by following the proper technique one can derive figures that are proportional to the ratio of highly water insoluble to very water soluble materials and thus the ratio of highly resinified to lowly resinified materials which in turn is correlated to the ratio of regulator to coherer.

It will be apparent from the foregoing that the resinous liquid product can be prepared from various resins and for that matter from previously prepared solid resins by simply mixing together sodium hydroxide, water, lowly reacted phenol-formaldehyde products and more highly reacted phenol-formaldehyde products, and that other solid resinoid materials such as shellac, gum accroides, vinyl and styrol resins, ethyl cellulose, other resinoid bodies such as cellulose esters or ethers may be used. However, where the phenol resin is used, the most suitable product is obtained by reacting the material complete from the beginning in order to provide an aqueous alkaline resin solution having the characteristics called for in my resinous liquid data.

*Example I.*—In making my resinous liquid composition I preferably use phenol and commercial U. S. P. formaldehyde in proportions which will be approximately stoichiometric when the reaction is completed, or by weight the ratio is 1:0.9, and place such product into an enclosed still provided with a high speed agitator and a condenser of large surface capacity which is arranged for refluxing and distillation. In charging this kettle I preferably start off with the entire quantity of phenol and I add thereto a solution of C. P. sodium hydroxide dissolved in a minimum of water and I then add approximately 30% of the total formaldehyde called for, which is approximately the quantity of higher reacted resinous products which are to constitute the approximate optimum of regulator called for in the specification. With the condenser set for refluxing, the temperature is gradually brought up to the boiling point and a tie up is produced which will provide a substantial quantity of these more highly reacted products comprising the regulator. At this point appropriate tests are made and a determination of the gram moles OH groups inactivated as contained in the kettle are definitely determined. As substantially all of the formaldehyde has been combined with some of the phenol the condenser is adjusted for distillation and a suitable amount of water is distilled out of the kettle, having in view that at the end of the completed reaction the percentage of incoherer will be within the limits called for. We now proceed with the balance of the reaction adding additional formaldehyde and this is preferably added at a kettle contents temperature of 150° F. and reacted to the point where the formaldehyde is substantially all combined, and giving due consideration to the test previously made in the case of the regulator we determine the condition of inactivation of the OH groups and condition of resinification by electrometric determinations and thereby determine the resinification so far as coherer is concerned. The reaction is carried on after the formaldehyde is tied up with the condenser set at distillation, distilling at a vacuum of approximately 28½ inches of mercury in order to eliminate further amounts of water so that the average composition of the resinous fluid will be within the limits called for.

While it is realized that additions of formaldehyde have previously been made in compositions by slowly adding formaldehyde to the phenol while reaction is proceeding, my reaction is carried out under such conditions that a portion of the formaldehyde is added in quantity sufficient to give a certain percentage of more highly reacted products, in the form of the regulator, and this reaction is carried out at relatively high temperatures, and then after determination of the exact degree of reactivity into more highly polymerized products the kettle charge is cooled down to a temperature where the reaction will be moderated, it being found that at relatively high temperatures the tendency is to produce resinification products of the highly reacted type and therefore I am by this means able to direct the reaction in such manner to insure the proper proportion of regulator and subsequently the proper proportion of coherer with definite tests without need for segregation which can be carried out through differential solubility if desired, and I am enabled to definitely check the average conditions prevailing for these four important components. Were average resinification definitely determined and if the percentage of incoherer (water) is excessive the resin in the still is cooled to a temperature approximately 120° F. and higher vacuum if necessary is maintained and the excess of water is eliminated by low temperature distillation.

A reaction carried out in this manner can be precisely gauged with respect to the four components and at the same time we obtain a certain degree of overlapping of constituents which have a resinification factor between that called for for the coherer and that called for for the regulator and I find that this is advantageous from a mere admixture of more highly and more lowly resinified products produced as an admixture from previously prepared materials although, as stated elsewhere, such preparation is not precluded.

In my preferred material the water content including some other volatiles will represent about 35%, and the other evaluations will be carried out within as close limits as possible called for in my data specification under my choice material.

*Example II.*—An equivalent proportion of trioxymethylene may be substituted for the first increment of formaldehyde in Example I. I have found that trioxymethylene has a tendency to react rapidly and produce the more highly resinified products which function as the regulator portion of my converting fluid. Where a product having the lower proportions of incoherer are desired, and where efficient vacuum pumps are not available for removing water, the use of trioxymethylene for producing the regulator component is advantageous.

*Example III.*—It follows, likewise, that should I so desire I can modify the formula so far as the proportion of phenol and formaldehyde is concerned and add a previously reacted product of high viscosity or a substantially solid soluble and fusible resin to the phenol required to provide the coherer and some of the bridging and overlapping fringes between the coherer and the regulator and then carry out the reaction at lower temperatures to provide substantially a reaction product which will produce these lower polymerization products, and in this manner I will provide a solution comprising the four components in their average reactivity as called for in the tabulations.

*Example IV.*—The entire fluid can be compounded of previously produced ingredients by having previously provided materials as characterized for the coherer, that is low resinification reaction products, together with a product more highly reacted, as called for under regulator, and adding thereto the required amount of incoherer and solubilizer and adjusting the formula as to inactivation of OH groups by the addition of phenol or incipient reaction products such as phenol alcohols and balancing the formula within the limits prescribed for my choice resinous liquid requirements.

The aqueous alkaline resinous liquid should be controlled within close limits as otherwise optimum working conditions may not be produced; the preferred physico-chemical limits of the liquid may be thus charted and explained:

liquid, and not strictly as limiting factors, since it will be obvious to those skilled in the art that variations may be made in the resinous liquid if compensated for in the dry powdered resins mixed therewith. Generally stated, the pH value of my preferred material is so gauged that it is preferably somewhat below the point at which a marked buffering tendency is indicated. That is, up to a pH of approximately 10 only a small amount of base is needed to rapidly raise the pH value and for the same reason when the dry pulverized resin is added the slight acidity of the resin rapidly lowers the pH value to a point where the resin separates from the aqueous solution and the water is probably external to the mix.

Water solubility ratio is determined by weighing out a definite amount of the converting liquid and slowly adding water thereto until a permanent turbidity appears. The ratio by volume of the water added to the amount of resinous liquid used for the test is the water solubility factor, that is, when based on a phenol-aldehyde reaction product, and it is to be understood that apparent turbidity due to added water insoluble reagents is to be disregarded as normal apparent turbidity, such adulteration giving pseudo end points. This is likewise true of the water tolerance in methanol.

The water tolerance in methanol is based on a phenol-formaldehyde resin which is unadulterated with very water insoluble substances for the

*Resinous liquid data*

| Test constants | Preferred limits | | | Possible limits | |
|---|---|---|---|---|---|
| | Low | Choice | High | Low | High |
| Viscosity, centipoises, 25° C | 60 | 100 | 200 | 50 | 375 |
| pH Value, Beckman electrometric | 9.0 | 9.3 | 9.8 | 7.3 | 14.0 or over |
| Water solubility ratio by weight. Alkaline resin solution given as 1 | 1:2.8 | 1:3.1 | 1:3.5 | 1:1 | 1:5 |
| Water tolerance in methanol | 180 ml. | 230 ml. | 300 ml. | 50 ml. | 400 ml. |
| Gram moles phenolic (OH) groups originally present [1] | 0.25 | 0.556 | 0.80 | 0.10 | 0.90 |
| Gram moles phenolic (OH) groups inactivated per 100 gr. of resin solution | 0.10 | 0.125 | 0.3 | 0.05 | 0.40 |
| Phenolic (OH) groups inactivated per cent of original phenolic (OH) groups in the resin solution | 18 | 22 | 27 | 10 | 40 |
| Ratio of alkaline material free to combine with phenolic (OH) groups [2] | 0.06 | 0.12 | 0.15 | 0.01 | 1.2 |
| "A" stage resinification factor | 10 | 14.7 | 25 | 5 | 45 |
| Water content, per cent | 25 | 35 | 45 | 10 | 55 |
| Rate of evaporation, per cent loss room conditions, 30 minutes | 8.00 | 12.90 | 18.00 | 5.00 | 25.00 |
| Vacuum, 29½", 24 hours | 17.00 | 25.50 | 29.00 | 16.00 | 40.00 |

[1] Gram moles phenolic (OH) groups originally possessed by the phenols that went into the making of 100 gr. of the resin solution.

[2] Ratio:
$$\frac{\text{Gr. normal wts. alkaline materials free to combine with phenolic (OH) groups}}{\text{Gr. moles phenolic (OH) groups in the resin solution}}$$

The viscosity given in the above table was determined on a Stormer viscosimeter at 25° C. Since the viscosity of the liquid component of my process plays an important part, the limits are rather narrow. A product having a viscosity exceeding 375 centipoises is not suitable. The resinous liquid should also have a low surface tension and low internal coherence. Such liquids readily wet and are easy to mix with abrasive grains and produce uniform coatings thereon. Furthermore, such mixes when wet have but little tendency to become sticky and tacky and to form agglomerates with the abrasive grains. Briefly, such mixes are relatively loose in character and present all surfaces of the wetted grains to the dry powdered resin.

The pH values are the values as determined on a Beckman glass electrode apparatus. The values given are to be considered as an aid to indicating and identifying a preferred type of resinous reasons given under the test for water solubility ratio. This test is conducted to determine the water tolerance of solutions of the resins in methanol at a fixed temperature and pH. This temperature is taken at close to ordinary room temperatures. A temperature of 25° C. is quite satisfactory. Through experimentation it was found that 100 ml. of methanol to the 10 gram sample of resin solution is quite satisfactory. The pH of the solution should be adjusted by the addition of alkali or acid to say a pH of 9. To carry out the test 10 grams of resin are dissolved in 100 ml. of methanol (multiples of this proportion may be used if desired). Water is then run in from a graduated burette and before cloudiness sets in the pH should be adjusted to 9 with the addition of normal aqueous alkali or acid. Additional distilled water is then run in and the point at which a permanent and distinct cloudiness sets in is taken as the limit and is taken as the water tolerance in ml. It might be stated that phenol, cresol, xylenol, etc. show a water tolerance of infinity. This is likewise true of the phenol alcohols. It is likewise true of a solution of say 25 parts of hexamethylenetetramine in cresol or phenol, the solution being unreacted. As resinification proceeds the water tolerance varies inversely therewith and becomes lower and lower; and where the test is carried out on a product of similar characteristics and similar types of phenols and aldehydes their water tolerance limits are directly indicative of degree of resinification within the "A" stage resin range. With the higher phenolic bodies the water tolerance for the same degree of resinification may show results different from those obtained where phenol is used in the resin composition and under these conditions comparative evaluations utilizing these different initial reagents should be checked against results obtained where phenol and formaldehyde is used. This is necessary because the limits set for my preferred material are narrow and best operating conditions require that the product be kept within these narrow limits.

The terms "gram moles phenolic (OH) groups originally present", "gram moles phenolic (OH) groups in activated per 100 grams of resin solution", "phenolic (OH) groups inactivated, per cent of original OH groups in the resin solution", "ratio of alkaline material free to combine with phenolic (OH) groups", and " 'A' stage resinification factor" will be treated collectively. I might state that the degrees of resinification we are dealing with in this test are all within the range described by Baekeland as "A" stage. The determination of degree of resinification and the factors of assistance in evaluating a useful resinous liquid have been developed particularly for the purpose of this specification, and as there is no published information on this subject a rather lengthy explanation will need to be given.

The data given is for the purpose of definitely evaluating the degree of reaction and the appraisal of this reaction product through definite numerical values; likewise, to obtain data as to resin concentration and to classify this resinous liquid as composed of a suitable admixture of the four components functioning as coherer, incoherer, regulator and solubilizer.

When using a Beckman pH meter equipped with a glass electrode, the phenolic (OH) groups can be determined by direct titration with a standardized alkali solution which provides a convenient and accurate method for determining the phenolic (OH) groups based upon the above fact. It is found that the phenolic (OH) groups play an important part in the process and as an indication of the degree of resinification.

The determination of phenolic (OH) groups: Phenols are practically neutral bodies, but in water and certain other mediums they behave as very weak acids. Thus phenol possesses a dissociation constant of $1.3 \times 10^{-10}$ comparable to other very weak acids such as arsenious and hydrocyanic. The alkali salts of the phenols are quite water soluble and yield aqueous solutions that are very alkaline and highly buffered. For the titration of phenolic bodies with alkali it is desirable to have the phenolic body completely in solution. Inasmuch as higher monhydric phenols as well as most liquid resins are rather insoluble in water it is necessary to add a coupling agent such as an alcohol. Furthermore, simple aqueous solutions do not yield satisfactory end points. It has been found that methanol is the most suitable alcohol for this purpose. The ratio of water to methanol has an important bearing on the results, particularly upon the sharpness of the end point. Preliminary tests have shown that a ratio of seven parts of water to twenty-five parts of methanol by volume is quite satisfactory. It is preferable to first dissolve the phenol or resin in the methanol and to then add the water; and in any instances where the water tolerance of the solution is insufficient to stand such a water concentration, special precautions have to be followed. In any event the pH of the solution at the starting point from which the amount of alkali for the titration is measured is adjusted to be closed to (7). The exact temperature is not important so long as it lies between 15° centigrade and 40° centigrade. Once set, the temperature compensator of the Beckman apparatus should be left alone even though the temperature may change during the course of the titration. During the titration the solution should be kept continuously agitated by means of a suitable stirring device.

The alkali solution for the titration consists of a normal solution of NaOH made up in one liter of aqueous methanol of the above referred to composition (7 vol. of water to 25 vol. methanol). The pH is most conveniently measured by means of a Beckman pH meter provided with a glass electrode. As alkali is run in the pH increases rapidly at first and then more slowly, and eventually the point is reached where the pH practically ceases to go up upon further addition of NaOH. (The pH may virtually be constant as more alkali is added.) The ml. NaOH required to reach this point starting from an original pH of seven (6.5–7.5) is recorded. Due to the fact that this end point is oftentimes not very sharply defined (as the changes in pH per ml. NaOH near the end point are barely perceptible) great care must be exercised and it is suggested that as this end point is being approached the NaOH be let run in in two (2) or two and one-half (2½) ml. portions and in this manner, with a little experience, the total ml. NaOH required can usually be established to within plus or minus two (2)—two and one-half (2½) ml. or better, depending upon the sensitiveness of the apparatus.

The amount of NaOH required is greater than the equation $ROH + NaOH \rightleftarrows RoNa + H_2O$ would indicate. Numerous tests have shown that for all simple phenols such as phenol, the cresols, xylenols, alpha and beta-naphthol, para-tertiary-amyl-phenol, para-tertiary-isobutyl-phenol, catechol, hydroquinone, resorcinol, etc., as well as liquid phenol aldehyde resins—when using such sized samples as to contain somewhere between 0.02 and 0.20 gr. mols. phenolic (OH) groups the following simple relationship exists: gr. mols. (OH) groups $= 0.783 \times$ gr. mol. NaOH used in the titration.

This electro-metric titration method thus permits of an accurate and relatively simple determination of phenolic (OH) groups.

Acids possessing a dissociation constant near that of the phenols should be absent; fortunately in practice such acids are seldom encountered. Phenols containing highly electro-negative substituted groups such as $Cl$, $Br$, $NO_2$, and etc. are too strongly acid in character to permit of their evaluation by the above formula.

The test is conveniently carried out as follows, bearing in mind all the aforementioned characteristics: ten (10) grams of phenol or phenol-aldehyde resin is dissolved in 250 ml. of methanol. 10 ml. of water are then added and the pH is then brought to between 7 and 7.5 by the addition of the above referred to NaOH solution or of concentrated C. P. hydrochloric acid (added drop by drop) depending upon whether the resin or phenol is acid or alkali. 60 more ml. of water are then added but if a precipitate starts forming before this full 60 ml. are added, it is best to first run in about half of the NaOH that will be required for the titration and to then add the remaining water. The alkali solution is then let run in until the above referred to end point has been reached. The total ml. NaOH run in from the time the solution had a pH of 7 to 7.5 is recorded and if this figure is multiplied by $7.82 \times 10^{-3}$ we have gr. mols. phenolic (OH) groups contained in 100 grams of the material being tested. (In case the gr. mols. phenolic (OH) groups is outside the range of 0.02 and 0.20 a larger or smaller sample should be taken).

Quantitatively the phenolic (OH) groups are calculated in terms of gr. mols per 100 grams of material. The electro-metric titration method furnishes the necessary data for this computation which may be equated as follows: gr. mols. phenolic (OH) groups per 100 grams of material=ml. normal NaOH used in titrating 10 grams of sample multiplied by the constant $7.82 \times 10^{-3}$.

By the term "original phenolic (OH) groups"—symbolized by $(OH)_{or}$ is designated the gr. mols. of phenolic (OH) groups originally possessed by the phenols that enter into the making of 100 grams of material tested.

Inactivated OH groups represent groups that were originally present, but after resinification no longer are detected by the electro-metric titration.

Gram moles of phenolic (OH) groups inactivated per 100 grams of resin solution is determined by determining the gram moles of phenolic (OH) groups in 100 grams of the material being tested, and subtracting this result from the gram moles of phenolic (OH) groups originally present. The difference is the "inactivated" phenolic groups.

Phenolic (OH) groups inactivated per cent of the original phenolic groups in the resin solution is calculated from the gram mols. phenolic (OH) groups inactivated immediately preceding.

The ratio of alkaline material free to combine with phenolic (OH) groups is readily determined in the following manner: The resin as usual is dissolved in the methanol and the 70 ml. of water are added or as much of it as possible without forming a precipitate when the pH is reduced to 7. The pH of the solution before the addition of acid is recorded. The acid is then added drop by drop to bring the pH to 7, as is explained in the description of the electro-metric titration method and then there is recorded the ml. normal NaOH required to bring the pH from 7 to the original value. In the absence of weak acids this quantity of NaOH is equal to the quantity of NaOH contained in the resin and that was free to combine with phenolic (OH) groups.

The "A" stage resinification factor is an important evaluation and in my choice of preferred material the limits are relatively close. It has been found that the per cent of original phenolic (OH) groups inactivated increases as the reaction between a phenol and an aldehyde proceeds. The following tabulation gives in a broad way the per cent inactivated phenolic groups at various stages of reaction between the original mixture of phenol and aldehyde and the fully reacted "C" stage resin:

| Percent inactivated phenolic groups | Type of resin |
|---|---|
| *Percent* | |
| 0–1 | No true resinous character. |
| 1–50 | Liquid resins, or incompleted "A" stage resins. |
| Approximately 50 | Solid "A" stage resins. |
| Between 50–100 | "B" stage. |
| Approximately 100 | "C" stage. |

The "A" stage resinification factor symbolized by $F_a$ is calculated from the formula $$\frac{(OH)_{in}}{(OH \text{ or } [(OH)_r - \frac{1}{2}(OH)_{or}]} = F_a$$

where $(OH)_{in}$ = inactivated phenolic (OH) groups
$(OH)_{or}$ = gram moles of phenolic groups originally present
$(OH)_r$ = gram moles of phenolic groups found in resin The formula is, of course, useful only when less than half of the phenolic (OH) groups have been inactivated, i. e. up to and including "A" stage resins.

It has been found that in a solution of phenol and aqueous formaldehyde catalyzed by a strong alkali as NaOH even at room temperatures but more rapidly at higher temperatures a reaction takes place which results in the gradual disappearance of free formaldehyde—probably due to the formation of phenol alcohols and analogous compounds. During this time the viscosity will be found to have gone up somewhat and the $(OH)_{in}$ will have taken on a definite value, but even after all the formaldehyde has practically disappeared as such the $(OH)_{in}$ will continue to go up at a rate and to a final value depending upon the original concentrations and the temperature. On the other hand, one can take an already prepared liquid resin and add formaldehyde to it and obtain an $(OH)_{in}$ that may be equal to the $(OH)_{in}$ of the above virtually formaldehyde free solution. In short, we can prepare numerous aqueous alkaline phenol-formaldehyde solutions possessed of one and the same $(OH)_{in}$, $(OH)_{or}$ and $(OH)_r$, yet these solutions are chemically and physically not identical. This shows quite plainly that the (OH) group data taken alone does not necessarily differentiate liquid resins from one another. This does not mean, however, that blends satisfactory for my purpose cannot be made and therefore such blends are not precluded if such blends provide the wet-dry product of my invention. Further on in the specification further data is given which will assist in the evaluation and the production of blends of this type and will indicate the limits within which results most favorable for this work are attainable.

When resins made by reacting phenol, aqueous formaldehyde and NaOH are compared with mixtures of formaldehyde, phenol, water, NaOH and completed and/or partially completed "A" stage resins in such proportions that the $(OH)_{in}$, $(OH)_{or}$, $F_{in}$ and viscosity is substantially the same for the mixture as for the said reaction product, it has been found that there are some differences. Some of these admixtures may even produce sticky mixes which remain wet while others may act satisfactorily. These differences are particularly apparent where the difference lies in a lower pH value upon standing, etc. While such mixtures are not precluded, care must be taken and actual mix tests made to determine whether or not the properties of the product will produce the wet-dry mix of my invention and come within the limits thus standardized. Further test data which is given later in the specification differentiates in this manner inasmuch as the higher reacted products having larger molecular size are calculated against the earlier reacted products and the workability of the mix can therefore be definitely determined by evaluating the material on the basis of all of the units of characterization given by me.

It is worth bearing in mind that $F_m$ represents an average value and is not to be interpreted as meaning that the whole of the resinous constituents of the resin are possessed of one and the same degree of resinification. Liquid resins depending upon the precise original composition and procedure followed in the making of the resin may in general terms be described as consisting of mixtures of phenol alcohols and phenol-aldehyde resins in various stages of resinification, possessing $F_m$ factors that may range all the way from zero to that of a completed "A" stage resin.

Water content, per cent, is calculated on the total weight of the coating liquid. The term "water" is used in its ordinary sense and as to whether the water is present as an addition product or results from some chemical reaction or represents an aqueous alkaline solution, is immaterial so far as my definition and limits are concerned. It may represent the liquid product of a non-resinous and liquid nature which remains with the resin after the reaction of a phenol-formaldehyde material has been completed, or it may represent water plus some other suitable ingredient such as triethanolamine or other alkali such as sodium hydroxide, or a solution suitable to provide a wet-mix which is self-converting at ordinary room temperatures to a dry mix comprising substantially individual grains.

Rate of evaporation, per cent loss, is determined by spreading a sample of the material under test weighing approximately 0.2 gram as a thin layer on a 50 mm. diameter watch glass, and allowing it to stand for a given length of time in the open air. The figures given for the preferred limits were obtained by carrying out the test at an average room temperature of 76° F. and an average relatively humidity of 55%. Weighings were made at the end of 30 minutes and the loss in weight taken as the amount evaporated, from which the per cent loss was calculated. "The rate of evaporation, per cent loss vacuum" was obtained in a similar manner, except that the watch glass containing the specimen under test was placed in a vacuum desiccator over calcium chloride, and a vacuum of approximately 29⅝ inches of mercury was maintained during the test. The temperatures during the tests was approximately 75° F.

In the making of the preferred solution I find that it is most satisfactory to introduce the alkali at the beginning of the reaction of the phenol and formaldehyde, as under these conditions the percentage of free formaldehyde is kept low and this promotes rapid evaporation of an aqueous medium. While I may start with a solid resin or liquid resin and cut this with an alkali, under these conditions it is preferable that the solution be allowed to stand for a number of hours prior to use or else that the product be heated somewhat to provide an alkaline solution which will quickly convert itself to the dry mix upon use.

I claim:

1. The method of making a resinous liquid for admixture with fillers and dry pulverized synthetic resins to produce a wet mixture which is self-convertible to a dry mix capable of being cold molded, which comprises mixing from 10% to 40% of a phenol-aldehyde reaction product wherein from 30% to 50% of the phenolic (OH) groups are inactivated, with from 20% to 70% of a phenol-aldehyde reaction product wherein only from 5% to 20% of the phenolic (OH) groups are inactivated, and adding alkali and water thereto to produce a homogenous liquid having a viscosity below 375 centipoises.

2. An alkaline liquid phenol-aldehyde resin of low viscosity for admixture with fillers and dry pulverized synthetic resins to produce a wet mixture which is self-convertible to a dry mix capable of being cold molded, said liquid resin originally having phenols in such quantity as to contain between 0.25 and 0.80 gram mol. of phenolic (OH) groups per 100 grams of the said liquid resin and resinified to a point where between 10 and 40 percent of the phenolic (OH) groups are inactivated.

3. An alkaline liquid phenol-aldehyde resin for admixture with fillers and dry pulverized synthetic resins to produce a wet mixture which is self-convertible to a dry mix capable of being cold molded, said liquid resin having a viscosity lower than 200 centipoises at 25° C., originally having phenols in such quantity as to contain between 0.25 and 0.80 gram mol. of phenolic (OH) groups per 100 grams of the said liquid resin and resinified to a point where between 18 and 27 per cent of said phenolic (OH) groups are inactivated, said liquid resin containing water of from 25 to 45 per cent.

4. An alkaline liquid phenol-aldehyde resin for admixture with fillers and dry pulverized synthetic resins to produce a wet mixture which is self-convertible to a dry mix capable of being cold molded, said liquid resin having a viscosity in centipoises at 25° C. within the range of 100, originally having phenols in such quantity as to contain between 0.25 and 0.80 gram mol of phenolic (OH) groups per 100 grams of the said liquid resin and resinified to a point where within the range of 22 per cent of said phenolic (OH) groups are inactivated, said liquid resin containing water within the range of 35 per cent.

5. An alkaline liquid phenol-aldehyde resin for admixture with fillers and dry pulverized synthetic resins to produce a wet mixture which is self-convertible to a dry mix capable of being cold molded, said liquid resin having a viscosity lower than 200 centipoises at 25° C., originally having phenols in such quantity as to contain between 0.25 and 0.80 gram mol of phenolic (OH) groups per 100 grams of the said liquid resin and resinified to a point where between 18 and 27 per cent of the phenolic (OH) groups are inactivated, said liquid resin having a water content of from 25 to 45 per cent and a pH value of from 9.0 to 9.8.

6. An alkaline liquid phenol-aldehyde resin for admixture with fillers and dry pulverized synthetic resins to produce a wet mixture which is self-convertible to a dry mix capable of being cold molded, said liquid resin having a viscosity lower than 200 centipoises at 25° C., originally having phenols in such quantity as to contain between 0.25 and 0.80 gram mol of phenolic (OH) groups per 100 grams of the said liquid resin and resinified to a point where between 18 and 27 per cent of said phenolic (OH) groups are inactivated, said liquid resin containing water of from 25 to 45 per cent and having a ratio of alkaline material free to combine with phenolic (OH) groups of from 0.08 to 0.15.

7. An alkaline liquid phenol-aldehyde resin for admixture with fillers and dry pulverized synthetic resins to produce a wet mixture which is self-convertible to a dry mix capable of being cold molded, said liquid resin having a viscosity lower than 200 centipoises at 25° C., originally having phenols in such quantity as to contain between 0.25 and 0.80 gram mol of phenolic (OH) groups per 100 grams of the said liquid resin and resinified to a point where between 10 and 40 per cent of the phenolic (OH) groups are inactivated, said liquid resin having a ratio of alkaline material free to combine with phenolic (OH) groups of from 0.01 to 1.2, having also a water content of from 25 per cent to 45 per cent, having also a pH value above 7 and having an "A" stage resinification factor of from 10 to 25.

8. An alkaline liquid phenol-aldehyde resin for admixture with fillers and dry pulverized synthetic resins to produce a wet mixture which is self-convertible to a dry mix capable of being cold molded, said liquid resin having a viscosity lower than 200 centipoises at 25° C., originally having phenols in such quantity as to contain between 0.25 and 0.80 gram mol. of phenolic (OH) groups per 100 grams of the said liquid resin and resinified to a point where between 18 and 27 per cent of the phenolic (OH groups are inactivated, having a ratio of alkaline material free to combine with phenolic (OH groups of from 0.08 to 0.15, having also a water content of from 25 per cent to 45 per cent, having also a pH value between 9.0 and 9.8, and having an "A" stage resinification factor of from 10 to 25.

9. An alkaline liquid phenol-aldehyde resin for admixture with fillers and dry pulverized synthetic resins to produce a wet mixture which is self-convertible to a dry mix capable of being cold molded, said liquid resin comprising between 20 and 70 per cent of low reaction resinous products and between 40 and 10 per cent of high reaction resinous products, the said liquid resin originally having phenols in such quantity as to contain between 0.25 and 0.80 gram mol. of phenolic (OH) groups for 100 grams of the said liquid resin and resinified to a point where the per cent of phenolic (OH) groups inactivated is between 10 and 40 per cent, the per cent phenolic (OH) groups inactivated in the aforesaid low reaction products being between 5 and 20 per cent and that of the high reaction products being between 30 and 50 per cent.

10. An alkaline liquid phenol-aldehyde resin for admixture with fillers and dry pulverized synthetic resins to produce a wet mixture which is self-convertible to a dry mix capable of being cold molded, said liquid resin comprising between 20 and 70 per cent with an optimum of about 40 per cent of low reaction resinous products and between 40 and 10 per cent with an optimum of approximately 30 per cent of high reaction resinous products, the said liquid resin originally having phenols in such quantity as to contain between 0.25 and 0.80 gram mol of phenolic (OH) groups per 100 grams of the said liquid resin and resinified to a point where the per cent of phenolic (OH) groups inactivated averages between 10 and 40 per cent, with an optimum of between 18 and 27 per cent, the per cent phenolic (OH) groups inactivated in the aforesaid low reaction products being between 5 and 20 per cent and that of the high reaction products being between 30 and 50 per cent.

11. The method of making a liquid phenol-aldehyde resin for admixture with fillers and dry pulverized synthetic resins to produce a wet mixture which is self-convertible to a dry mix capable of being cold molded, which consists in reacting the phenol at high reaction velocity with only a portion of the aldehyde present to produce between 10 and 40 per cent of high reaction products of resinification, wherein between 30 and 50 per cent of the phenolic (OH) groups are inactivated, and then completing the reaction by adding additional increments of the aldehyde to produce between 20 and 70 per cent of low reaction products of resinification wherein between 5 and 20 per cent of the phenolic (OH) groups are inactivated, the high and low reaction products producing an intermixture comprising a substantially stable liquid resin.

EMIL E. NOVOTNY.